Nov. 15, 1960     R. OLDENBURGER     2,960,629
METHOD AND APPARATUS FOR CONTROLLING A CONDITION
Filed Nov. 28, 1956     2 Sheets-Sheet 2
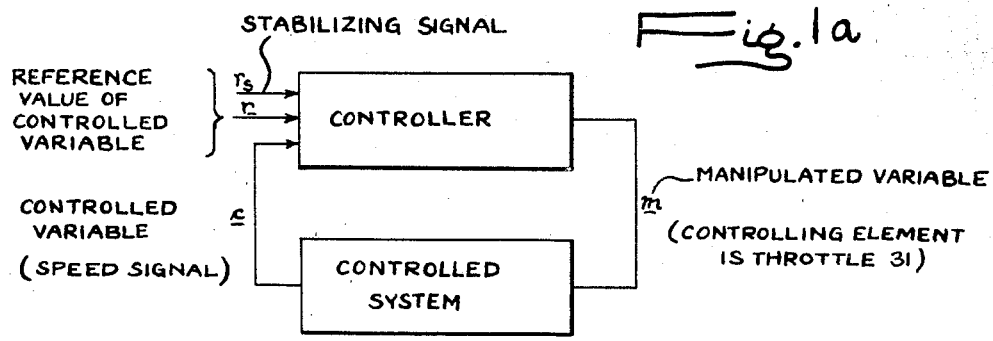
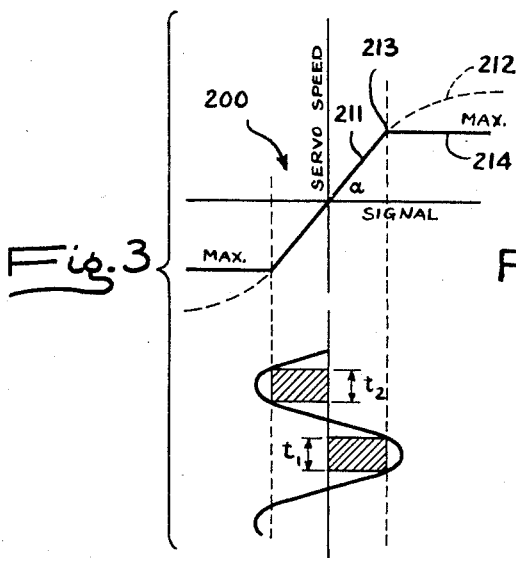
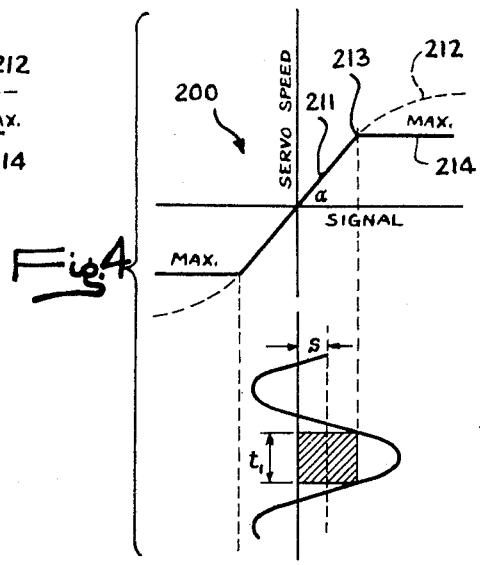
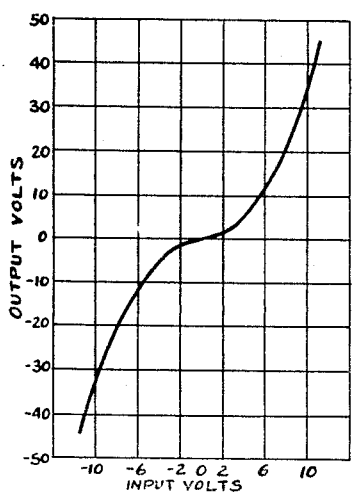
CHARACTERISTIC OF ABSQUARING AMPLIFIER 156
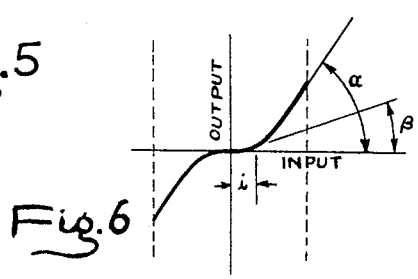
INVENTOR
RUFUS OLDENBURGER
by: Carlson, Pitzner, Hubbard & Wolfe
ATTYS.

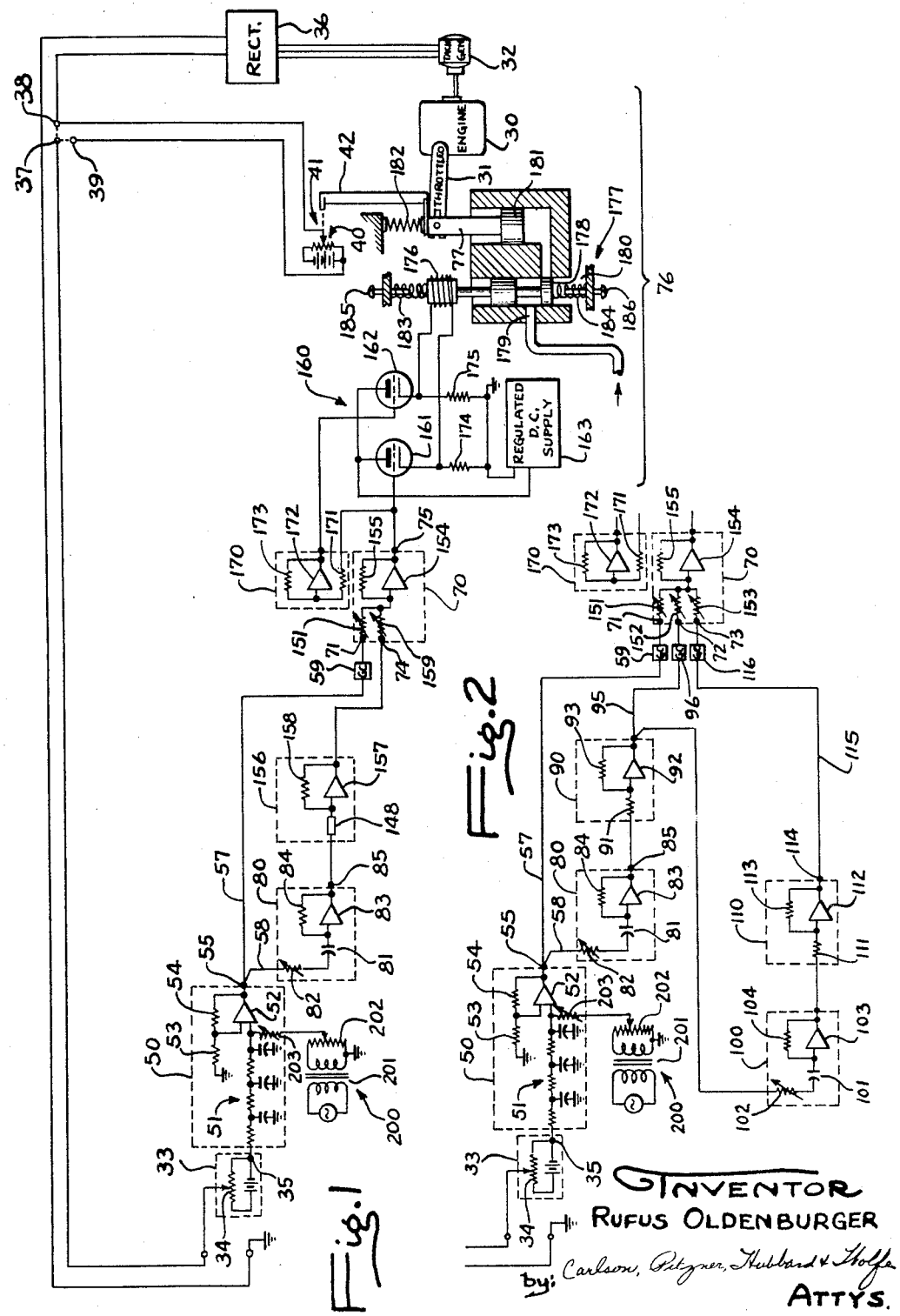

United States Patent Office 2,960,629
Patented Nov. 15, 1960

2,960,629

METHOD AND APPARATUS FOR CONTROLLING A CONDITION

Rufus Oldenburger, Lafayette, Ind., assignor to Woodward Governor Company, Rockford, Ill., a corporation of Illinois Filed Nov. 28, 1956, Ser. No. 624,860

8 Claims. (Cl. 317—5)

The present invention relates to automatic condition control systems and more particularly to an improvement in a speed-control governor.

In my prior application Ser. No. 384,957, filed October 8, 1953 there is disclosed a novel control system for controlling speed or other condition distinguished by rapid response to transient changes with a minimum of overswing or hunting about the control point.

It is the primary object of the present invention to bring about a further improvement in the response of a control system of the type shown in my copending application as well as to improve the performance of more conventional control systems, systems of the so-called linear type.

It is a more specific object of the present invention to provide an improved control system which may be operated at higher gain levels, with accompanying improved response, without however, giving rise to objectionable hunting about the control point. It is a related object to provide a control system which is capable of employing a higher gain setting but in which the effective gain is changed automatically upon departure of the condition from the control point.

It is another object to provide an improvement described above which is applicable to control systems of many different specific designs and to existing systems without substantial expense or substantial modification of the system.

Other objects and advantages of the invention will become apparent upon study of the following detailed description and upon reference to the drawings in which:

Figure 1 is a schematic diagram of an improved control system constructed in accordance with the present invention.

Fig. 1a is a schematic showing of a closed control loop.

Fig. 2 is a modified form of the control system.

Figs. 3 and 4 are diagrams showing the preferred relation between the auxiliary signal and the bounding which takes place in thee control system.

Fig. 5 shows a typical characteristic of an absquaring amplifier.

Fig. 6 is a characteristic curve relating Figs. 3–5.

Referring now to the drawings, Figure 1 shows schematically one form of the present invention. The disclosure in this figure corresponds to that shown in Figure 11 of the copending application identified above. The simplicity of the arrangement tends to point up the present improvement which has been made, although it will be understood that such improvement is equally applicable to all of the embodiments disclosed in the earlier case.

The automatic controller of Figure 1 is used for governing engine speed, the engine being indicated diagrammatically at 30. The engine speed is controlled by a throttle 31 and means are provided for continuously measuring the engine speed and for detecting deviations or errors in such speed from a desired value or "control point." In the present instance this measuring device includes a tachometer generator 32. The directing means is completed by a source of auxiliary voltage 33 which is settable by a control 34. The detector circuit is so arranged that the output voltage of the tachometer generator is in series with voltage source 33, with the polarities in bucking relation, so that the net voltage appearing at output terminal 35 has direction and magnitude which correspond to the direction and magnitude of the departure in speed. The tachometer may be of the D.-C. or A.-C. type; in the latter event the output is rectified by a rectifier 36 as shown.

Where straight "isochronous" control is desired, the rectified tachometer voltage is simply bucked against the adjustable voltage from the source 33, the circuit being completed by interconnecting terminals 37, 38. However, where it is desired to provide "droop," as for example, where a number of engines are operated in parallel with one another, a source of droop voltage 40 is provided having a control 41 which is directly coupled to the throttle of the engine by means of a mechanical link 42. Such voltage is added in series by transferring the connection from terminals 37—38 to 37—39.

The net voltage at the terminal 35 forms the basic deviation signal which, as an initial step, is passed through a filter 50. This filter is so constructed as to remove the electrical "noise" which accompanies the signal. The term "noise" is a general one and refers to any extraneous high frequency components in the control signal. In an engine, noise results primarily from the fact that power is obtained from separate explosions and from impact of the individual gear teeth where gears are used. The filter includes an RC network 51 and an operational amplifier 52 having associated resistors 53, 54 and feeding an output terminal 55. During the course of discussion frequent reference will be made to operational amplifiers, indicated in each case by the conventional triangular symbol. It will be understood that such amplifiers are standard units of the type used in analog computing apparatus, such, for example, as described at page 152 in Electronic Analog Computers, by Korn and Korn, McGraw-Hill, 1952, and which are commercially manufactured by George A. Philbrick Researches, Inc. of Boston, Massachusetts. Reference is made to the descriptive literature covering the Model K2–W amplifier for operating characteristics. A high value of feedback insures linearity; for practical purposes the gain of a given stage is the ratio of the amplifier shunt or feedback impedance to the series or input impedance and is independent of minor variations in tube characteristics.

The output of the amplifier unit 52 is applied to two lines 57, 58. In the first, the deviation signal is utilized directly; in the second it is differentiated, forming a first derivative. From the line 57 the signal passes through a gain changer 59 described in detail in the copending application. The output terminal of the gain changer is connected to the first input terminal of a signal adder 70 having input terminals 71, 74 and an output terminal 75. The purpose of the signal adder is to add together the error signal and a function thereof, to form a net control signal at the output terminal 75. This net signal is then used to control a "motor operator" indicated generally at 76, which includes a final control element 77 connected to the throttle 31. The motor operator will be discussed at a later point.

Referring back to the line 58 at the output of the filter 50, a differentiator unit 80 is provided having a differentiating capacitor 81, an input resistor 82, an amplifier 83 and a feedback resistor 84. The differentiator unit acts to differentiate the input signal, i.e., to take the first derivative with respect to time. The output, or derivative signal is applied to an output terminal 85 which is connected to an absquaring unit 156 having an absquaring resistor 148, an amplifier 157 and a feedback resistor 158. The amplifier 157, in addition to amplifying the signal, inverts it so that it is in proper phase.

The absquaring resistor 148, as fully defined in the copending application passes a current which produces an output signal proportional to the square of the input signal but retaining the sign of the latter. The result is to produce a "non-linear" control system which, when properly adjusted is distinguished by greatly improved response as compared to more conventional systems of the linear type.

The selection of a resistor material having the desired absquaring characteristic is a problem which is well within the scope of one skilled in this art. A number of non-linear resistor materials are available on the market which exhibit the desired characteristic in varying degrees. The material known as thyrite has been found to be particularly suitable (Type V–3, 900, 353 sold by the General Electric Company). A typical characteristic is shown in Fig. 5. It will be understood, however, that the invention is not limited to the use of this material but would include the use of any other materials of devices exhibiting the same general input-output characteristic.

The output signal of the absquaring unit 156 is added to the deviation signal in the adder 70 previously referred to. This addition is accomplished by a network consisting of resistors 151, 159. Such resistors are preferably variable to enable the signal components to be varied with respect to one another. The net signal is fed into an amplifier 154 having a feedback resistor 155 to produce a net output signal at the terminal 75.

Attention may next be given to the motor operator 76 which converts the signal from the control unit into mechanical movement of the throttle. The first part of the motor operator is a cathode follower stage 160 having vacuum tubes 161, 162, and supplied by a regulated D.-C. power supply 163. In order to produce an output signal which is proportional to the signal at the terminal 75 in direction as well as magnitude, the signal fed to the tube 162 is inverted in phase by an inverter 170 having an input resistor 171, an amplifier 172 and a feedback resistor 173. In operation one tube conducts more and the other less, depending upon the polarity of the voltage, causing a corresponding increase and decrease in the voltage across the respective cathode resistors 174, 175.

Connected between the cathodes of tubes 161, 162 is a control winding 176 of an hydraulic servo device 177. The servo has a pilot valve 178 which cooperates with a supply port 179 and a sump 180, to control the flow of fluid to a servo cylinder having a piston 181. The piston 181 is connected to the final control element 77, which in turn operates the engine throttle. Return movement of the throttle is obtained by providing a return spring 182.

The pilot valve in the present device is provided with centering springs 183, 184 as well as stops 185, 186, which prevent the pilot valve from moving substantially beyond its "full on" or "full off" condition. Hammering of the stops, is, however, minimized by limiting the current which is supplied to the winding 176. Such limiting is accomplished by utilizing the effect of current saturation in the tubes 161, 162. The point of saturation depends upon the tube characteristics, circuit resistances and operating voltages, and is a matter which is well within the capability of one skilled in the art.

Having completed the loop, reference may be made to Fig. 1a which shows the loop in more generalized form, the "controlled system" in the present instance being the engine, and with the reference and speed signals (derived from the tachometer 32 and from the control 34 in the example of Fig. 1) being indicated at r and c respectively.

In practicing the present invention, it is desirable to employ a servo in which the speed of response of the output, e.g., the velocity at which the throttle 31 is moved by the motor operator 76 when the latter is "full on" and "full off," is as high as possible. In a practical case, the speed of the servo piston 181 is limited by the allowable size of the servo device and the pressure and rate of flow of the fluid which is available to operate it. In general, it is not desirable for the servo device to consume more than a fraction of a percent of the maximum power of the engine which it controls. As a practical matter, when controlling an average internal combustion engine, I prefer to use a servo having maximum speed on the order of 5 to 10 or more inches per second, when subjected to normal frictional loading. For a reason which will be more fully appreciated as the discussion proceeds, the system is "bounded" so that servo speed, i.e., the rate of correction of the condition, does not continue to increase but reaches a point at which the speed is constant and maximum. Specifically in the present device the overall characteristic of the motor operator 76 should follow the curve set forth in Fig. 3 of the drawings. Here it will be noted that the servo speed varies directly in proportion to the applied control signal up to the point at which the maximum servo speed is attained. In carrying out the invention, I prefer that the motor operator be so designed that the maximum servo speed is attained with a control signal which is only about 1/10 of the maximum control signal, the maximum control signal being defined as that which results upon making an extreme and abrupt change in the loading of the engine 30, for example by dropping full load. This insures that the servo will operate at its maximum speed of response in the face of almost all normally encountered disturbances, and excepting only those minor disturbances which occur in the vicinity of the control point under conditions of substantial equilibrium. While bounding in the servo or motor operator portion of the device is convenient and preferred, one skilled in the art will recognize that the invention is applicable to any bounded closed loop system.

For the adjustment procedure applicable to a circuit of the type shown in Fig. 1 and for typical values of circuit constants reference may be made to the above mentioned application. Reference may also be made to the application for information on the gain changer 59 which has been included in the present circuit simply to show its possible position in the circuit. Its use is optional and it will suffice to say that the gain changer is for the purpose of decreasing the coefficient of the departure of deviation signal for very small values in the region of the origin.

In accordance with the present invention means are provided for injecting into the control system an auxiliary alternating voltage at a point in the system between the condition measuring means, such as the tachometer 32, and the non-linear resistor element 148 for the purpose of securing further improvement in response and to further reduce the tendency of the control system to hunt when employing large values of gain. In the present instance such auxiliary alternating voltage is derived from a source 200 comprising a transformer 201 fed from a convenient A.-C. supply and having an output potentiometer 202 permitting any desired portion of the secondary voltage to be utilized. For the purpose of coupling the source 200 to the control circuit, a variable series resistor 203 is used which, as shown in Fig. 1, is connected between the filter 51 and the amplifier 52 in the unit 50. It is to be emphasized, however, that the auxiliary alternating voltage need not be inserted at the point shown, but can be inserted at any point in the channel ahead of the absquaring resistor 148 without departing from the invention.

In accordance with one of the aspects of the present invention the amplitude of the auxiliary alternating signal is so chosen as to exceed by a small margin the limits of the bounding element. This will be made clear upon reference to Fig. 3 where the servo speed is plotted against the signal appearing at any point in the linear channel. For purposes of initial explanation, the effect of the absquaring channel 58, 80 and 156 will be neglected. Here it will be noted that the servo speed rises with increasing signal along path 211 which, for convenience, is taken as a straight line although it will be understood that the curve may in a practical case, depart somewhat from a straight line. Absent a bounding effect in the servo system, the servo speed would continue to increase along some curve 212. However, in the present device, and in most practical servos, especially where of the hydraulic type, limiting takes place at a point 213, so that further increase of the signal beyond this value will not produce any increase in servo speed, and the curve is flat as indicated at 214. This condition corresponds to the control valve 178 being fully open. The servo speed is correspondingly limited in the opposite direction as will be noted upon observing the shape of the curve for negative signal values.

With regard to the amplitude of alternating voltage, my observations have shown that it should be 1.2 to 2 times the value needed to make the servo speed maximum. It is possible that values greater than this may be employed without departing from the present invention, but it seems clear that values of 10 times the limiting values are excessively high and should not be used. In the present instance it is assumed that the maximum voltage is 1.2 times the limiting value and in Fig. 3 a plot of the auxiliary voltage is made immediately below and in alinement with the plot of servo speed.

While the invention has been described in Fig. 1 in connection with a non-linear system, it is equally applicable in improving the performance of linear systems, i.e., systems which do not use an absquaring element. A typical linear system is shown in Fig. 2 where means are provided for obtaining the second as well as the first derivative.

The circuit shown in Fig. 2 is similar, in many respects, to that shown in Fig. 1 with the exception that the absquaring unit 156 is removed, with provision being added for generating straight first and second derivative signals. Corresponding elements in the two figures are indicated by corresponding reference numerals.

In the arrangement shown in Fig. 2 the output of the derivative unit 80 is fed into an inverter 90. The inverter is simply an amplifier unit having a gain of unity used to restore proper sign and includes an input resistor 91, an operational amplifier 92, and a feedback resistor 93. The derivative signal from the unit 90 passes through a line 95 into a gain changer 96 to terminal 72 and thence to a network resistor 152 in the adder 70.

In order to obtain a second derivative signal, a second differentiator unit 100 is used having a differentiating capacitor 101, an input resistor 102, an amplifier 103 and feedback resistor 104. To restore proper sign, the second derivative signal is passed through an inverter 110 having an input resistor 111, an amplifier 112, and a feedback resistor 113. The output terminal 114 of the inverter is connected to the third input terminal 73 of the signal adder 70 via a line 115 and a gain changer 116 as shown, addition being effected by resistor 153 in the adding network. The gain changers 96, 116 may be considered optional and, in any event, are constructed and adjusted in accordance with the disclosure in my copending application to which reference is made.

The adjustment procedure for the control circuit per se shown in Fig. 2 is within the skill of the art, being set forth in some detail in my copending application beginning at page 18. The means for injecting the auxiliary alternating voltage namely, parts 200–203 inclusive, are the same as described in connection with Fig. 1. In making the final adjustment, the gain of the control loop is made sufficiently high so that hunting occurs with the auxiliary alternating voltage at or near zero. The auxiliary voltage is then increased by advancing the control 202 until the hunting stops, and resulting in improved response for the system as a whole. This same procedure may also be followed in arriving at a proper amplitude of the auxiliary signal in the non-linear system illustrated by Fig. 1.

In an endeavor to explain the advantages to be derived from employing the auxiliary signal, the effect of the auxiliary signal upon gain may be considered. The nominal gain in Fig. 3 is indicated at alpha, being the slope of the curve relating servo speed and signal. When a relatively high auxiliary alternating voltage is superimposed, it will be noted that on each half cycle the system spends an appreciable portion of the time beyond the limiting value. Observing the time axis in the lower portion of Fig. 3, which illustrates the condition of equilibrium, it will be seen that during one-half cycle the limiting value is exceeded during an amount of time indicated at $t_1$. The same situation exists in the alternate half cycles, as indicated at $t_2$. The net effect is that for most of the time the signal is on the flat portions of the characteristic curve where the slope and consequently, the gain of the system are both zero. Thus, averaging the time spent on the sloped and flat portions, the effect is to reduce the average gain to a value which is substantially less than the nominal value.

As mentioned above, it is desirable for the gain to be set at high value for best possible response of a control system, the limitation being that increases of gain beyond a certain point will cause undesirable hunting. It is one of the features of the present invention that the controller may be set for high values of gain without the undesirable hunting which would normally be expected. The reason for this is that the average gain, taking into account the large amount of time spent beyond the limiting condition is effectively reduced to a value less than that which will cause hunting.

When the deviation signal is zero, as at equilibrium, a symmetrical condition is produced which results in a net decrease of effective gain but with no tendency for correction to take place. This insures stability when the controller variable is at the control point. However, when a deviation signal of positive or negative polarity comes through, and is combined with the auxiliary signal, the total or resultant signal appears as the algebraic sum of the two. Assuming that the deviation signal is positive in polarity and for some short period has a constant value S, the net control signal appears as the auxiliary stabilizing voltage with its line of symmetry shifted to the right along the signal axis by the amount S as shown in Fig. 4. In other words, the auxiliary voltage is superimposed on the deviation signal S to provide a total signal which has an A.C. component alternating about the deviation signal. This destroys the condition of symmetry about the zero signal line producing a net effective signal on the positive side of the axis and resulting in corrective adjustment of the throttle. It will be noted in Fig. 4 that the swing on the left or negative direction is not sufficient to attain the limiting signal value. Consequently the shift of the alternating signal to the right not only unbalances the control system for corrective action of the servo but also changes the relative gain for positive and negative values. Specifically, the gain in the positive direction will be decreased, since the signal, by reason of the shift, spends proportionally greater time on the flat portion of the curve, while in the negative direction the signal spends no time on the flat portion of the curve, with the result that gain is increased to the full nominal value alpha. It is believed that this change of relative gain accounts in some measure for the improvement in performance which is brought about by the present invention. In operation, the circuit gain may be adjusted to a point which will produce hunting, following which the auxiliary voltage may be increased by the control 202 to a point which stops the hunting.

The above explanation for the sake of simplicity has considered the effect of the auxiliary signal upon the control signal in a linear portion of the system, the input and output of the servo being linearly related by the angle alpha (Figs. 3 and 4) over the operating range up to the point of limiting. Stated in other words, in the above explanation it has been assumed that the system is linear within the bounding limits. The latter is true of the linear system shown in Fig. 2; it is also true of the "non-linear" system of Fig. 1 for all signals of appreciable magnitude, i.e., not in the region of the origin. However, in a system of the type shown in Fig. 1 containing an absquaring element, the gain for signals in the region of the origin is not alpha but a lower value beta (Fig. 6). The reason for this is that the characteristic of the absquaring channel partakes of a parabola as shown in Fig. 5 and is thus asymptotic to the horizontal axis at the origin.

It follows from the above that as far as the absquaring channel is concerned (80, 156 in Fig. 1), the effect of the auxiliary signal is to raise the channel gain for small signal values. The reasoning is somewhat analogous to that employed in connection with Figs. 3 and 4. Assume that an auxiliary signal is used, as above, having an amplitude which greatly exceeds the amplitude of $i$ over which the gain is beta. For small signal values, i.e. with the auxiliary signal substantially centered on the vertical axis, the net signal speds most of its time on the "alpha" portion of the curve where the gain is relatively high and very little time on the beta portion of the curve where the gain is low. The effective average gain, will therefore be high, on the order of alpha. One interesting fact implicit in the above is that the effect of the auxiliary signal is different, or at least distinguishable, in the systems of Figs. 1 and 2 in the linear and non-linear portions thereof respectively. Yet the effect of the auxiliary signal is to produce an improvement in response in each instance.

With regard to the wave form of the auxiliary voltage, a sine wave is preferred since such a wave is conveniently available from an A.-C. source. My observations have indicated however, that the invention is not limited to the use of a sine wave, being equally applicable to other wave forms excepting, however, a square wave. A square wave is not satisfactory, since, for values exceeding the limiting value, all of the time is spent beyond the break point, i.e., on the flat portion of the control curve, so that excessive reduction of gain results.

My observations show further that the frequency of the auxiliary signal may be varied over a wide margin without departing from the invention. As to the lower limit, I prefer to employ a frequency which is greater than the natural frequency of a system i.e., greater than the frequency of the hunting which will result at high gain absent the alternating voltage. There appears to be no upper limit and "white noise" consisting of random high frequency components seems to work satisfactorily. Usually the supply voltage of 60 cycles or 400 cycles may be employed since both of these values are above the natural frequency of conventional automatic control systems.

Applying the teachings of the present invention will not act as a panacea to cure hunting in all hunting systems. Thus the present techniques will not overcome the severe hunting which occurs because of the presence of one or more excessive lags in the system. Generally speaking, however, the present procedure will reduce or eliminate hunting in those systems where it is normally possible to remove the hunting condition by a reasonable reduction in gain.

The improvement brought about is particularly surprising in view of the simplicity and low cost of the added components. The scheme, as will be apparent to one skilled in the art, is applicable not only to closed loop systems of the type shown in Figs. 1 and 2 but to all automatic condition control systems of the closed loop type, including existing systems in which hunting may be overcome by reasonable reduction in loop gain.

I claim as my invention:

1. In a control system of the closed loop type for controlling a condition, the combination comprising means including a detector for detecting departure from a desired condition and for producing a control signal in accordance therewith, means coupled to said detector and responsive to such control signal for making a corrective adjustment in said condition, said correcting means including a bounding element so constructed and arranged that correction is effected at a rate which is a function of said signal for small values of departure from said condition and at a maximum rate for all values of departure greater than a predetermined limiting value, and means for producing an auxiliary alternating signal and for coupling the same into said correcting means so that it is superimposed on said control signal, said auxiliary signal having an amplitude which exceeds the limiting value of the bounding element.

2. In a control system of the closed loop type for controlling a condition, the combination comprising means including a detector for detecting departure from a desired condition and for producing a control signal in accordance therewith, means coupled to said detector and responsive to such control signal for making a corrective adjustment in said condition, said correcting means including a bounding element so constructed and arranged that correction is effected at a rate which is a function of said signal for small values of departure from said condition and at a maximum rate for all values of departure greater than a predetermined limiting value, and means for producing an auxiliary alternating signal and means for coupling said last means to said correcting means such that said auxiliary signal is superimposed on said control signal, said auxiliary signal having an amplitude which exceeds the limiting value of the bounding element and having a frequency which exceeds the natural frequency of the control system.

3. In a control system of the closed loop type for controlling a condition, the combination comprising means including a detector for detecting departure from a desired condition and for producing a control signal in accordance therewith, means including a servo coupled to said detector and responsive to such control signal for making a corrective adjustment in said condition, said servo being so constructed and arranged that correction is effected at a rate which is a function of said control signal when the latter has small values and at a maximum rate for all values of control signal greater than a predetermined limiting value, and means for producing an auxiliary alternating signal and for coupling the same to said servo in superimposed relation on said control signal, said auxiliary signal having an amplitude which exceeds the limiting value of the servo.

4. In a control system of the closed loop type for controlling a condition, the combination comprising means including a detector for detecting departure from a desired condition and for producing a control signal in accordance therewith, means including a servo coupled to said detector and responsive to such control signal for making a corrective adjustment in said condition, said means being so constructed and arranged that correction is effected at a rate which is a function of the value of said signal for limited signal values within about 10% of the maximum value of control signal and at a maximum rate for all values of control signal greater than said 10%, and means for producing an auxiliary alternating signal and for coupling the same to said corrective adjusting means superimposed on said control signal, said auxiliary signal having an amplitude which exceeds said 10% of the maximum value of control signal.

5. The combination, with a control system of the closed loop type for continuously controlling a condition according to departures of that condition from a desired value, said system having a closed loop including a bounding element connected therein, of means coupled with such system for injecting into the latter an alternating signal having an amplitude sufficient when acting alone to drive the system beyond the bounds of said bounding element and having a frequency substantially greater than the natural frequency of the system.

6. In a control system of the closed loop type for controlling a condition, the combination comprising means including a detector for detecting departure of the condition from the desired value and for producing a control signal varying as a function of such departure, means coupled to said detector and continuously responsive to such signal for making a corrective adjustment in said condition, said responsive means including a nonlinear element for providing nonlinear response to said control signal, and means coupled to said system for injecting an auxiliary alternating signal into said system for addition to said control signal at a point following the detector but ahead of the nonlinear element.

7. In a control system of the closed loop type for controlling a condition, the combination comprising means including a detector for detecting departure from the desired condition and for producing a control signal varying as a function of such departure, means including a bounding element coupled to said detector and continuously responsive to such signal for making a corrective adjustment in said condition, said responsive means including an absquaring element for providing nonlinear response to said control signal, and means coupled to said responsive means for injecting an auxiliary alternating signal into said system for addition to said control signal at a point following the detector but ahead of the absquaring element, said alternating signal having sufficient amplitude so as to exceed the level at which limiting by said bounding element occurs under equilibrium conditions.

8. In a control system of the closed loop type for controlling a condition, the combination comprising means including a detector for detecting departure from a desired condition and for producing a control signal varying as a function of such departure, means coupled to said detector and continuously responsive to such control signal for making a corrective adjustment in said condition, said responsive means being so constructed and arranged so that the rate of correction is proportionally related to the control signal for a small range of values defining a proportional band and with the rate of correction being at a substantially constant maximum value on each side of said proportional band, and means coupled to said responsive means for producing an auxiliary alternating signal superimposed upon said control signal, said auxiliary signal having an amplitude extending slightly beyond said proportional band in each direction under conditions of equilibrium.

References Cited in the file of this patent

UNITED STATES PATENTS 2,532,723     Knoop _____ Dec. 5, 1950